US012591869B2

(12) United States Patent (10) Patent No.: US 12,591,869 B2
Kothari (45) Date of Patent: Mar. 31, 2026

(54) BIFURCATED PROCESSING

(71) Applicant: Visa International Service Association, San Francisco, CA (US)

(72) Inventor: Buddhi Prakash Kothari, Bangalore Karnataka (IN)

(73) Assignee: Visa International Service Association, San Francisco, CA (US)

( * ) Notice: Subject to any disclaimer, the term of this patent is extended or adjusted under 35 U.S.C. 154(b) by 72 days.

(21) Appl. No.: 18/498,841

(22) Filed: Oct. 31, 2023

(65) Prior Publication Data

US 2025/0139600 A1 May 1, 2025

(51) Int. Cl.
*G06Q 20/10* (2012.01)
*G06Q 20/32* (2012.01)

(52) U.S. Cl.
CPC ......... *G06Q 20/10* (2013.01); *G06Q 20/3224* (2013.01)

(58) Field of Classification Search
CPC .................................................... G06Q 20/10
USPC ........................................................ 705/39
See application file for complete search history.

(56) References Cited

U.S. PATENT DOCUMENTS

2012/0150728 A1* 6/2012 Isaacson ............ G06Q 30/0226
705/39
2015/0356548 A1* 12/2015 Luna-Rodriguez ........................
G06Q 30/0278
705/39

OTHER PUBLICATIONS

Author: Bogdan Carbunar et al; Title: Tipping Pennies? Privately Practical Anonymous Micropayments; Publisher: IEEE; Date of Publication: Jun. 15, 2012 (Year: 2012).*
Author: Yash Madhwal et al; Title: Privacy-Preserving Blockchain-Based Tips Service; Published: IEEE; Date Added to IEEE Xplore: Dec. 4, 2023 (Year: 2023).*
"Cashless Tipping: (Literally) Everything You Need To Know", Blog, Available Online at: https://kickfin.com/blog/cashless-tipping-101/#:~:text=Cashless%20tipping%2C%20sometimes%20known%20as,service%20provider%20digitally%2Fwithout%20cash, Accessed from Internet on Oct. 11, 2023, 4 pages.
(Continued)

*Primary Examiner* — Olabode Akintola
*Assistant Examiner* — Hatem M Ali
(74) *Attorney, Agent, or Firm* — Kilpatrick Townsend & Stockton LLP

(57) ABSTRACT

A method includes receiving, by aggregator platform computer from a user device of first user, remittance message including at least a service amount for service rendered by second user to the first user; identifying, by the aggregator platform computer, that the remittance message includes an additional amount that accompanies the service amount; upon identifying that the remittance message includes the additional amount, forwarding, by the aggregator platform computer to a plug-in computer, the remittance message including the service amount and the additional amount; identifying, by the plug-in computer in the remittance message, the service amount and the additional amount; and separating, by the plug-in computer, the service amount from the additional amount. The plug-in computer facilitates transfer of the additional amount from an account of the first user to an account of the second user and sends, to the aggregator platform computer, a service remittance message including the service amount.

18 Claims, 8 Drawing Sheets

(56)  References Cited

OTHER PUBLICATIONS

"Kickfin, Visa Team on Real-Time Tip Payouts for Service Industry", Available Online at: https://www.pymnts.com/partnerships/2022/kickfin-visa-team-on-real-time-tip-payouts-for-service-industry/, May 12, 2022, pp. 1-14.

"Wise Partners with Payfare to Solve International Money Transfer for Gig Workers", Available Online at: https://www.compareremit.com/news/wise-partners-with-payfare-to-solve-international-money-transfer-for-gig-workers/, Dec. 21, 2021, 8 pages.

* cited by examiner

FIG. 1B

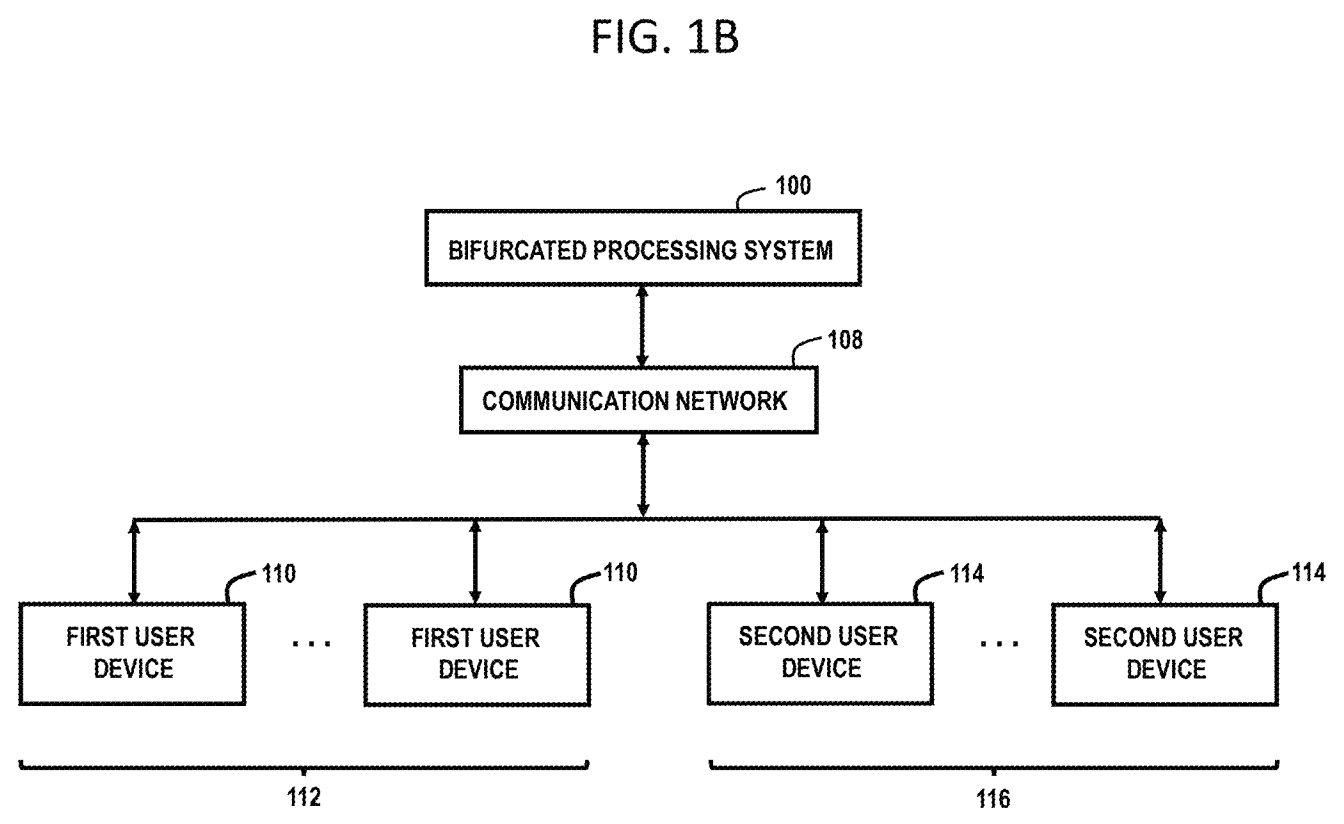

BIFURCATED PROCESSING SYSTEM 100

COMMUNICATION NETWORK 108

FIRST USER DEVICE 110

FIRST USER DEVICE 110

112

SECOND USER DEVICE 114

SECOND USER DEVICE 114

116

FIG. 2
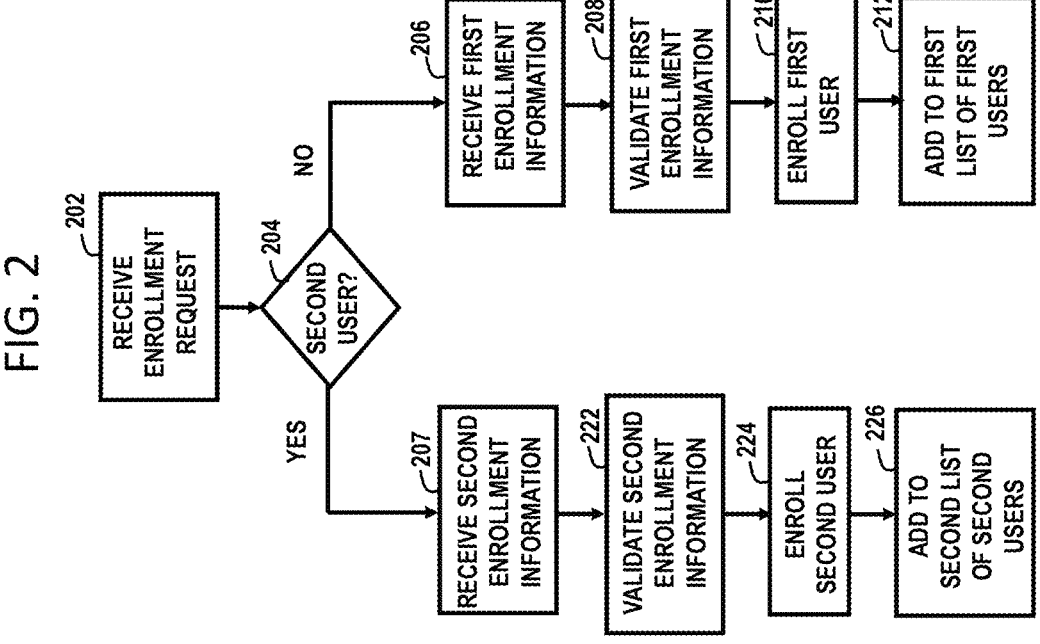

FIG. 5

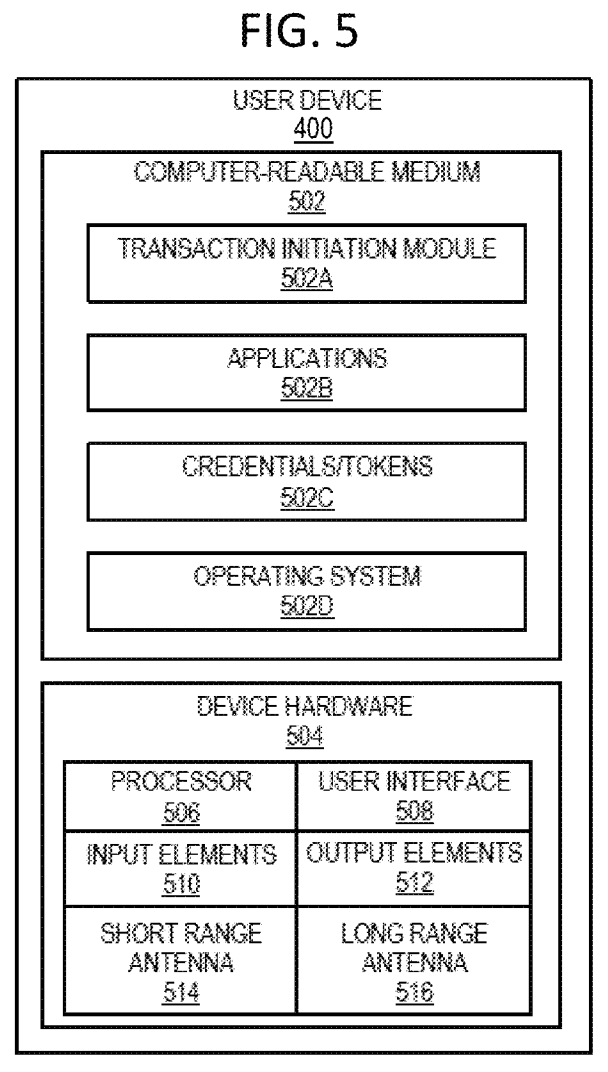

USER DEVICE
400

COMPUTER-READABLE MEDIUM
502

TRANSACTION INITIATION MODULE
502A

APPLICATIONS
502B

CREDENTIALS/TOKENS
502C

OPERATING SYSTEM
502D

DEVICE HARDWARE
504

PROCESSOR
506

USER INTERFACE
508

INPUT ELEMENTS
510

OUTPUT ELEMENTS
512

SHORT RANGE ANTENNA
514

LONG RANGE ANTENNA
516

FIG. 6

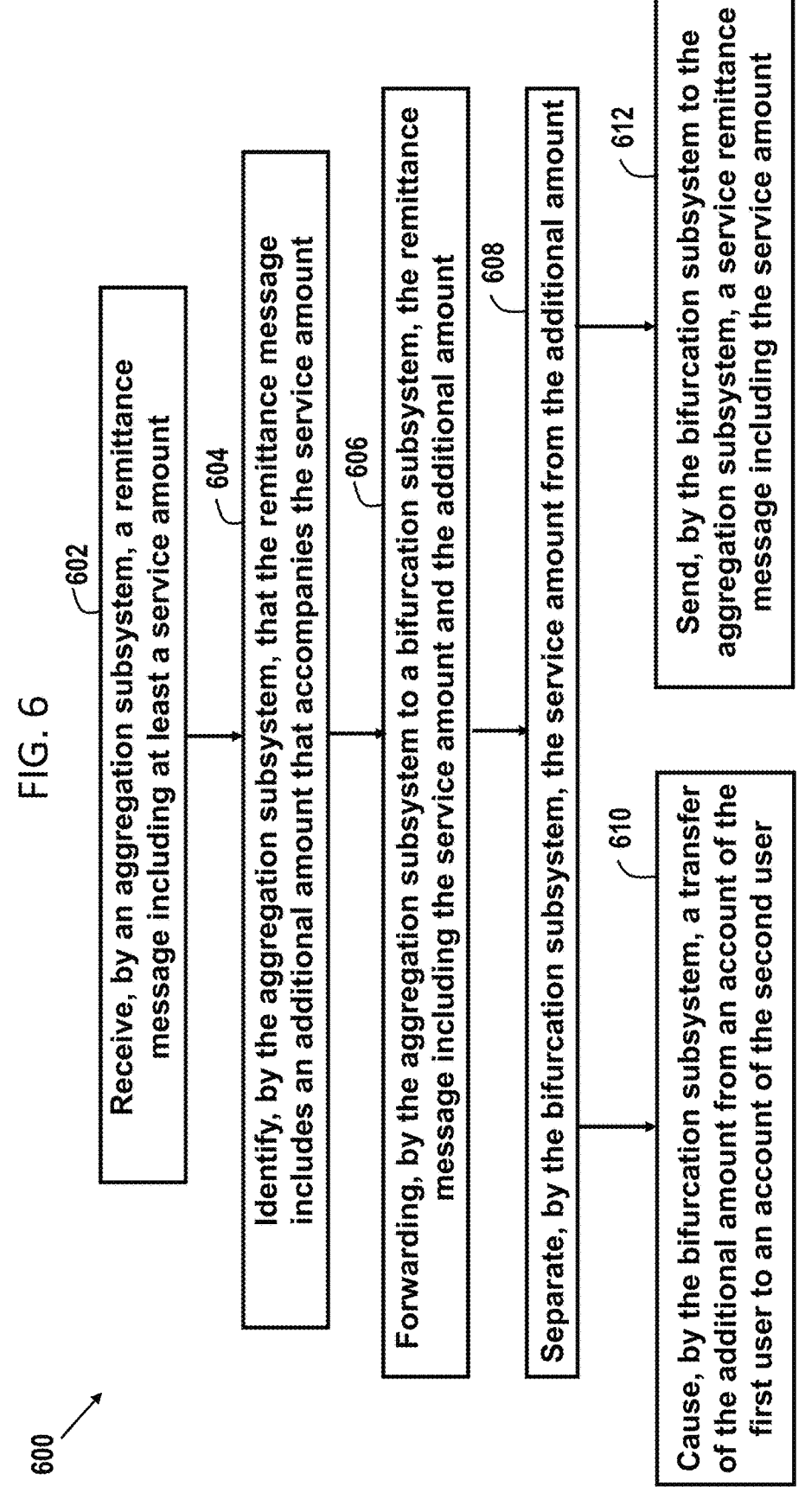

600

602

Receive, by an aggregation subsystem, a remittance message including at least a service amount

604

Identify, by the aggregation subsystem, that the remittance message includes an additional amount that accompanies the service amount

606

Forwarding, by the aggregation subsystem to a bifurcation subsystem, the remittance message including the service amount and the additional amount

608

Separate, by the bifurcation subsystem, the service amount from the additional amount

610

Cause, by the bifurcation subsystem, a transfer of the additional amount from an account of the first user to an account of the second user

612

Send, by the bifurcation subsystem to the aggregation subsystem, a service remittance message including the service amount

BIFURCATED PROCESSING

BACKGROUND

In some instances, the customers desire services to be provided at a personalized level. Such services can include catering, cleaning, plumbing, etc., and may be provided at the customer's home or in any other location specified by a customer.

Typically, if a customer desires to tip a worker, the customer may add a tip amount to a service fee due for the service. The total amount, e.g., a sum of the service fee and the tip amount, then is held in care of an entity that provided the worker to the patron, where the entity makes scheduled payouts to the worker. The scheduled payouts may include any tips contributed by one or more patrons to whom the worker provided services.

This arrangement is problematic because the entity does not separate the service fee and the tip amount, and the service provider does not have immediate access to the tip amount, even though the tip portion of the payment is solely based on the quality of the performed services (e.g., is not related to the entity arranging an interaction between the service provider and the customer).

Embodiments of the disclosure address the above-noted problems and other problems individually and collectively.

SUMMARY

According to an aspect of an embodiment, a method is provided. A method includes: receiving, by an aggregator platform computer from a user device of a first user, a remittance message including at least a service amount for a service rendered by a second user to the first user; identifying, by the aggregator platform computer, that the remittance message includes an additional amount that accompanies the service amount; upon identifying that the remittance message includes the additional amount, forwarding, by the aggregator platform computer to a plug-in computer, the remittance message including the service amount and the additional amount; identifying, by the plug-in computer in the remittance message, the service amount and the additional amount; separating, by the plug-in computer, the service amount from the additional amount; assigning, by the plug-in computer, a first interaction identifier to the service amount and a second interaction identifier to the additional amount, where the assigning the second interaction identifier to the additional amount causes a service processing computer associated with the plug-in computer to transfer, in real time, the additional amount from an account of the first user to an account of the second user, the account of the second user being associated with a user device of the second user; and sending, by the plug-in computer to the aggregator platform computer, a service remittance message including the service amount and the first interaction identifier.

According to an aspect of an embodiment, a computer system is provided. The computer system includes: a plug-in computer; and an aggregator platform computer including a first processor and a first non-transitory computer-readable medium including a first set of code that, when executed by the first processor, causes the first processor to: receive, from a user device of a first user, a remittance message including at least a service amount for a service rendered by a second user to the first user; identify that the remittance message includes an additional amount that accompanies the service amount; and upon identifying that the remittance message includes the additional amount, forward, to the plug-in computer, the remittance message including the service amount and the additional amount. The plug-in computer includes a second processor and a second non-transitory computer-readable medium including a second set of code that, when executed by the second processor, causes the second processor to: identify, in the remittance message, the service amount and the additional amount; separate the service amount from the additional amount; assign a first interaction identifier to the service amount and a second interaction identifier to the additional amount, where the assigning the second interaction identifier to the additional amount causes a service processing computer associated with the plug-in computer to transfer, in real time, the additional amount from an account of the first user to an account of the second user, the account of the second user being associated with a user device of the second user; and send, to the aggregator platform computer, a service remittance message including the service amount and the first interaction identifier.

A better understanding of the nature and advantages of embodiments of the invention may be gained with reference to the following detailed description and accompanying drawings.

BRIEF DESCRIPTION OF THE DRAWINGS

FIG. 1B is a simplified block diagram of a portion of the bifurcated processing system according to at least one embodiment.

FIG. 2 is a simplified block diagram of the registration and enrollment processing according to at least one embodiment.

FIG. 5 shows is a simplified block diagram of a user device according to at least one embodiment.

FIG. 6 shows a simplified block diagram of a method according to at least one embodiment.

DETAILED DESCRIPTION

Figure 1A:
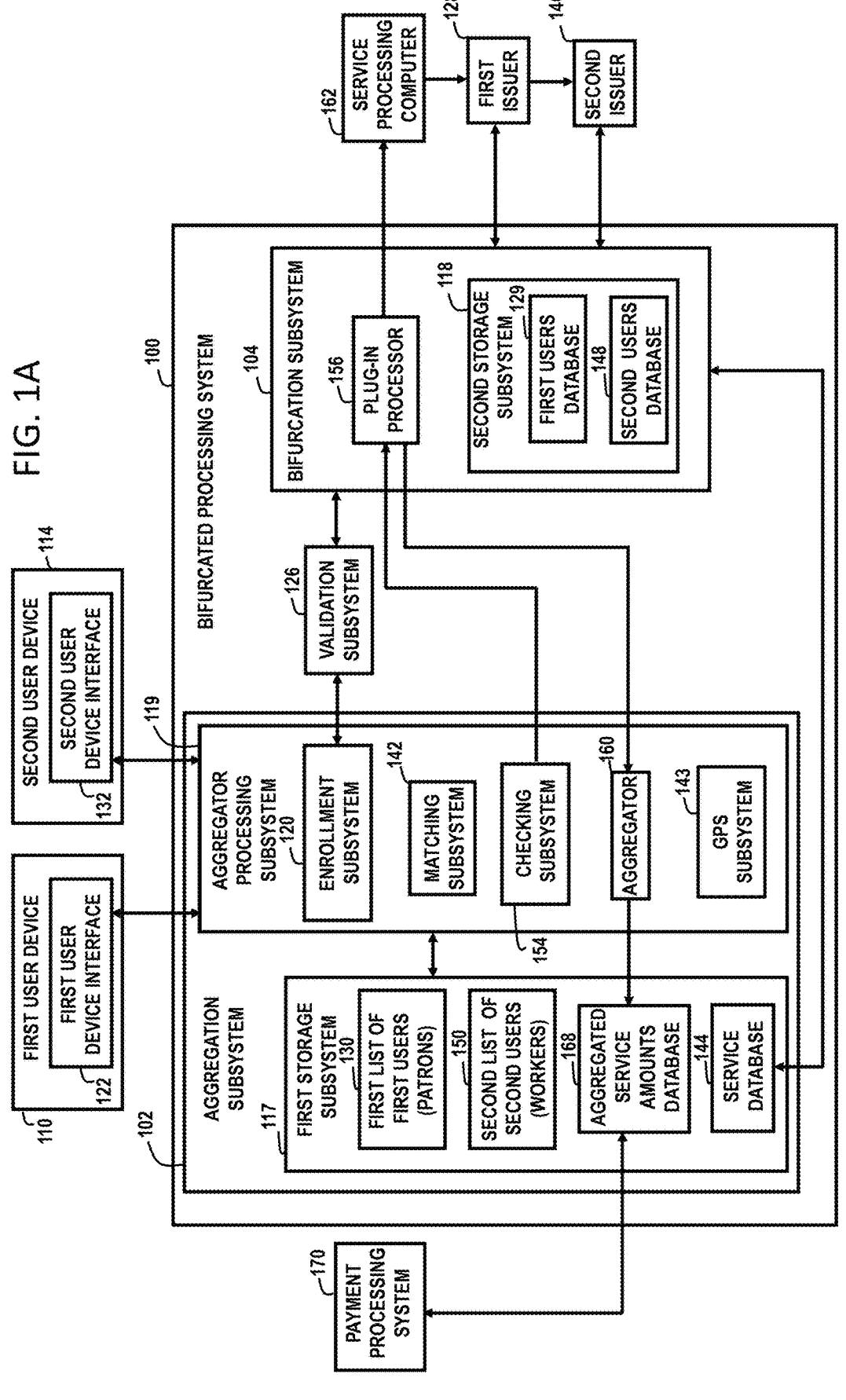
FIG. 1A is a simplified block diagram of a bifurcated processing system according to at least one embodiment.

Prior to discussing embodiments of the disclosure, some terms can be described in further detail.

An "application" may be computer code or other data stored on a computer-readable medium (e.g. memory element or secure element) that may be executable by a processor to complete a task.

An "authorizing entity" may be an entity that authorizes a request. Examples of an authorizing entity may be an issuer, a government agency, a document repository, an access administrator, etc. An authorizing entity may operate an authorizing entity computer.

An "issuer" may refer to a business entity (e.g., a bank) that issues and optionally maintains an account for a user. An issuer may also issue payment credentials to the consumer that may be stored on a user device.

A "processor" may refer to any suitable data computation device or devices. A processor may include one or more microprocessors working together to accomplish a desired function. The processor may include a CPU including at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may include a non-transitory computer-readable medium that stores instructions that can be executed by a processor to implement a desired method. Examples of memories may include one or more memory chips, disk drives, etc. Such memories may operate using any suitable electrical, optical, and/or magnetic mode of operation.

A "mobile communication device" or a "mobile device" may include any suitable electronic device that may be transported and operated by a user, which may also optionally provide remote communication capabilities to a network. Examples of remote communication capabilities include using a mobile phone (wireless) network, wireless data network (e.g., 3G, 4G, 5G, or similar networks), Wi-Fi, Bluetooth, Bluetooth Low Energy (BLE), Wi-Max, or any other communication medium that may provide access to a network such as the Internet or a private network. Examples of mobile communication devices include mobile phones (e.g., cellular phones), personal digital assistants (PDAs), tablet computers, net books, laptop computers, wearable devices (e.g., watches), vehicles such as automobiles and motorcycles, personal music players, hand-held specialized readers, etc. A mobile communication device may include any suitable hardware and software for performing such functions, and may also include multiple devices or components (e.g., when a device has remote access to a network by tethering to another device—i.e., using the other device as a modem-both devices taken together may be considered a single mobile communication device).

A "user" may include an individual. In some embodiments, a user may be associated with one or more user devices.

A "user device" may be a device that is operated by a user. Examples of user devices may include a mobile phone or device, a smart phone, a card, a PDA, a laptop computer, a desktop computer, a server computer, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. Example of the input sensors may include accelerometers, cameras, microphones, etc. The user input obtained by the input sensors may be from a variety of data input types, including, but not limited to, audio data, visual data, or biometric data. The user device may include any electronic device that may be operated by a user, which may also provide remote communication capabilities to a network. Examples of remote communication capabilities include using a mobile phone (wireless) network, wireless data network (e.g., 3G, 4G, 5G or similar networks), Wi-Fi, Wi-Max, or any other communication medium that may provide access to a network such as the Internet or a private network.

A "resource provider" may be an entity that can provide a resource such as goods, services, information, and/or access to a location (e.g., a parking space, a transit terminal, etc.). Examples of resource providers include merchants, government authorities, secure data providers, etc. A resource provider may operate one or more access devices.

A "resource provider computer" can be a computer operated by a resource provider. An example of a resource provider computer can be an access device.

A "credential" may be any suitable information that serves as reliable evidence of worth, ownership, identity, or authority. A credential may be a string of numbers, letters, or any other suitable characters that may be present or contained in any object or document that can serve as confirmation.

A "value credential" may be information associated with worth. Examples of value credentials include payment credentials, coupon identifiers, information needed to obtain a promotional offer, etc.

"Payment credentials" may include any suitable information associated with an account (e.g., a payment account and/or payment device associated with the account). Such information may be directly related to the account or may be derived from information related to the account. Examples of account information may include a bank account number, primary account number (PAN) (e.g., "account number"), username, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment credentials may be any information that identifies or is associated with a payment account. Payment credentials may be provided in order to make a payment from a payment account. Payment credentials can also include a username, an expiration date, a gift card number or code, and any other suitable information.

A "token" may be a substitute value for a credential. A token may be a string of numbers, letters, or any other suitable characters. Examples of tokens include access tokens such as payment tokens, data that can be used to access secure systems or locations, etc.

A "payment token" may include an identifier for a payment account that is a substitute for an account identifier, such as a bank account number, a primary account number (PAN), and/or an expiration date. For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may include one or more computational apparatuses and may use any of a variety of computing structures, arrangements, and compilations for servicing the requests from one or more client computers. A server computer can be a cloud computer.

FIG. 1A is a simplified block diagram of a bifurcated processing system 100 according to at least one embodiment. FIG. 1B is a simplified block diagram of a portion of the bifurcated processing system 100 according to at least one embodiment.

The bifurcated processing system 100 may be implemented using one or more computer systems, each computer system having one or more processors. The bifurcated processing system 100 may include multiple components and subsystems communicatively coupled to each other via one or more communication mechanisms. For example, in an embodiment shown in FIG. 1A, the bifurcated processing system 100 includes an aggregation subsystem 102 and a bifurcation subsystem 104. These subsystems may be implemented as one or more computer systems. The systems, subsystems, and other components shown in FIG. 1A may be implemented in software (e.g., code, instructions, program) executed by one or more processing units (e.g., processors, cores) of the respective systems, using hardware, or combinations thereof. The software may be stored on a non-transitory storage medium (e.g., on a memory device). The bifurcated processing system 100 shown in FIG. 1A is merely an example and is not intended to unduly limit the scope of embodiments. Many variations, alternatives, and modifications are possible. For example, in some implementations, the bifurcated processing system 100 may have more or fewer subsystems or components than those shown in FIG. 1A, may combine two or more subsystems, or may have a different configuration or arrangement of subsystems. The bifurcated processing system 100 and subsystems shown in FIG. 1A may be implemented using one or more computer systems, such as the computer system shown in FIG. 7.

With reference to FIG. 1B, the bifurcated processing system 100 can be in communication with various user devices via a communication network 108. In an embodiment, the bifurcated processing system 100 can be in communication with one or more first user devices 110 among a first plurality of user devices 112. The bifurcated processing system 100 can also be in communication with one or more second user devices 114 among a second plurality of user devices 116. In embodiments, the first user device 110 may be referred to as the first user mobile device or the user device of the first user. The second user device 114 may be referred to as the second user mobile device or the user device of the second user.

As an example, the first plurality of user devices 112 may be user mobile devices, e.g., user mobile phones, of a first plurality of users who desire to acquire various services. The second plurality of user devices 116 may be user mobile devices, e.g., user mobile phones, of a second plurality of users who provide various services to the first plurality of users who operate the first plurality of user devices 112.

The first plurality of users may be customers who desire to acquire various services and may include individuals, e.g., service recipients or patrons, who desire to acquire services on the fly from the service providers who are not associated with a traditional employment agreement, contractual agreement, etc. The second plurality of users who provide the services may be individuals, e.g., service providers or workers, who are not associated with an employment agreement, contractual agreement, etc., and are willing to provide one-time or multi-time services to the first plurality of users. Herein, one-time or multi-time services may include services provided at someone's home, e.g., computer tune-up, plumbing, gardening, cleaning, babysitting, pet sitting, etc. However, this is not intended to be limiting. One-time or multi-time services may include services provided outside of someone's home, e.g., a limo service, catering, etc.

In various embodiments, the aggregation subsystem 102 is a platform through which the first plurality of users who desire a service to be provided can connect with the second plurality of users capable of delivering the service. The bifurcation subsystem 104 may be a platform through which the aggregation subsystem 102 processes the interactions between the first plurality of users and the second plurality of users.

As shown in FIG. 1A, the aggregation subsystem 102 includes a first storage subsystem 117 that may store the various data constructs and programs used by the aggregation subsystem 102. The bifurcation subsystem 104 includes a second storage subsystem 118 that may store the various data constructs and programs used by the bifurcation subsystem 104. For example, the first storage subsystem 117 and the second storage subsystem 118 may store information related to the first plurality of users and the second plurality of users that use the aggregation subsystem 102. However, this is not intended to be limiting. In alternative implementations, the information related to the first plurality of users and the second plurality of users that use the aggregation subsystem 102 may be stored in other memory storage locations (e.g., different databases) that are accessible to the aggregation subsystem 102 (or the bifurcation subsystem 104), where these memory storage locations can be local to or remote from the aggregation subsystem 102 and/or the bifurcation subsystem 104. In addition, other data used by the aggregation subsystem 102 or generated by the aggregation subsystem 102 as a part of its functioning may be stored in the first storage subsystem 117. Likewise, any data used by the bifurcation subsystem 104 or generated by the bifurcation subsystem 104 as a part of its functioning may be stored in the second storage subsystem 118.

With continuing reference to FIG. 1A, the aggregation subsystem 102 can include an aggregator processing subsystem 119. The aggregator processing subsystem 119 is configured to facilitate matching of the first plurality of users with the second plurality of users and process interactions of the first plurality of users with the second plurality of users, by cooperating with the bifurcation subsystem 104. In some embodiments, the aggregator processing subsystem 119 may be referred to as an aggregator platform computer.

The aggregator processing subsystem 119 may include an enrollment subsystem 120. The enrollment subsystem 120 facilitates the registration and enrollment of the first plurality of users and the second plurality of users with the aggregation subsystem 102. For simplicity, the description below refers to one first user among the first plurality of users and one second user among the second plurality of users. Likewise, the description below refers to one first user device 110 among the first plurality of user devices 112 and one second user device 114 among the second plurality of user devices 116. However, this is not intended to be limiting. It is to be understood that the embodiments are applicable to any number of the first plurality of users and their associated first user devices and any number of the second plurality of users and their associated second user devices.

In an example, the first user device 110 includes a first user device interface 122. The first user device interface 122 is described in a greater detail below with reference to FIG. 4. During the enrollment, the first user operating the first user device 110 may access an enrollment application provided by the enrollment subsystem 120. As a result of the first user accessing the enrollment application, the enrollment application may be displayed on the first user device interface 122 as one or more of graphical user interface (GUI) items.

For example, the enrollment application may provide prompts on the first user device interface 122. The first user may, in response to the prompts, provide their enrollment information, e.g., first enrollment information, through the first user device interface 122, for example, using one or more input devices provided in the first user device interface 122. The enrollment information may include, as non-limiting examples, a name and/or address of the first user, an e-mail of the first user, a telephone number associated with the first user device 110 (e.g., a telephone number of the mobile phone of the first user), etc. As described in detail below, in an embodiment, the telephone number associated with the first user device 110 operated by the first user is linked to account information of the first user, e.g., a payment account or payment credential of the first user. Optionally, the first user may provide their account information during the enrollment.

However, the described-above is not intended to be limiting. In some embodiments, the first user may perform a limited enrollment process where the first user is not requested to provide all the information described above, as, for example, in the case when the first user only desires the service to be provided once or based on some limited basis. As another example, the first user may order the service on the fly and would not be registered with the aggregation subsystem 102. In such embodiments, the aggregation subsystem 102 does not obtain account information of the first user.

In some implementations, the bifurcated processing system 100 may further include a validation subsystem 126. However, this is not intended to be limiting. In some embodiments, the validation subsystem 126 may be incorporated into the aggregation subsystem 102. As an example, the validation subsystem 126 may be a part of the aggregator processing subsystem 119.

The validation subsystem 126 may receive the enrollment information of the first user and may validate the enrollment information by authenticating the first user, calculating a risk score for the first user, etc. The validation of the first user may be performed by cooperating with the bifurcation subsystem 104.

For example, the validation subsystem 126 may generate and send a first user authentication request message to the bifurcation subsystem 104. The bifurcation subsystem 104 may retrieve, based on the enrollment information of the first user, information about one or more account credentials associated with the first user, e.g., by using a first user identifier, such as the telephone number provided by the first user.

For example, in an embodiment, a first issuer 128, e.g., a first bank, may maintain the account credential of the first user. The bifurcation subsystem 104 may send an account credential request message with the first user identifier of the first user to the first issuer 128. The first issuer 128 may return an account credential response message with the account credential information (e.g., a primary account number, a token identifier, or a payment credential identifier) of the first user.

Upon confirmation of the authenticity of the account credential of the first user, the bifurcation subsystem 104 may store the account credential information of the first user in association with that user identifier, e.g., the telephone number, in the second storage subsystem 118. For example, the bifurcation subsystem 104 stores the account credential information of the first user in association with the user identifier in a first users database 129.

The bifurcation subsystem 104 can send a first user authentication response message that informs the validation subsystem 126 that the account credential information of the first user is retrieved and stored, e.g., validated.

Upon completion of the validations, the validation subsystem 126 may provide a validation result to the enrollment subsystem 120.

In the case that the validation result indicates a successful validation, the enrollment subsystem 120 may complete the enrollment of the first user and store information related to the first user in a first list 130 containing information of the first plurality of users. For example, the enrollment subsystem 120 can assign a patron identifier to the first user who completed the registration and enrollment process. The enrollment subsystem 120 may add, e.g., store, information associated with the first user in the first list 130, where the patron identifier of the first user may be associated with that first user's telephone number and may serve as a first user identifier for the enrolled first user.

A process for registration and enrollment of the second user is similar to what is described above with respect to the first user.

In an example, the second user device 114 includes a second user device interface 132. The second user device interface 132 is described in a greater detail below with reference to FIG. 4. During the enrollment, the second user operating the second user device 114 may access the enrollment application provided by the enrollment subsystem 120. As a result of the second user accessing the enrollment application, the enrollment application may be displayed on the second user device interface 132 as one or more of GUI items, similarly to what is described above with respect to the registration and enrollment process of the first user.

The enrollment application may provide prompts on the second user device interface 132. The second user may, in response to the prompts, provide their enrollment information, e.g., second enrollment information, through the second user device interface 132, for example using one or more input devices provided in the second user device interface 132. The enrollment information may include, as non-limiting examples, a name and/or address of the second user, an e-mail of the second user, a telephone number associated with the second user device 114 (e.g., a telephone number of the mobile phone of the second user), one or more preferred geographic areas (e.g., one or more zip codes) for providing service, etc.

In certain implementations, as a part of the registration and enrollment process, the second user may be provided with a list of professional services, on the second user device interface 132. Each of the professional services may have associated service identifier identifying the professional service. The second user may be prompted to select one or more professional services or one or more service identifiers that this particular second user is interested in enrolling for with the aggregation subsystem 102.

The validation subsystem 126 may receive the enrollment information of the second user and may validate the enrollment information by authenticating the second user, calculating a risk score for the second user, etc.

For example, the validation subsystem 126 may send a second user authentication request message to the bifurcation subsystem 104. The bifurcation subsystem 104 may retrieve, based on the enrollment information of the second user, information about one or more account credentials associated with the second user, e.g., by using a second user identifier, such as the telephone number provided by the second user.

For example, a second issuer 146, e.g., a second bank, may maintain the account credential of the second user. The bifurcation subsystem 104 may send an account credential request message with the second user identifier of the second user to the second issuer 146. The second issuer 146 may return an account credential response message with the account credential information, e.g., a primary account number, a payment credential identifier, etc., of the second user.

However, the described above is not intended to be limiting. The second issuer 146 may be the same as the first issuer 128.

Upon confirmation of the authenticity of the account credential of the second user, the bifurcation subsystem 104 may store the account credential information of the second user in association with the user identifier, e.g., the telephone number, in a second users database 148 of the second storage subsystem 118. The bifurcation subsystem 104 can send a second user authentication response message that informs the validation subsystem 126 that the account credential of the second user is retrieved and stored, e.g., validated.

Upon completion of the validations, the validation subsystem 126 may provide a validation result to the enrollment subsystem 120.

In the case that the validation result indicates a successful validation, the enrollment subsystem 120 may complete the enrollment of the second user and store information related to the second user in a second list 150 containing information of the plurality of second users. For example, the enrollment subsystem 120 can assign a service provider identifier to the second user who completed the registration and enrollment process.

The enrollment subsystem 120 may add, e.g., store, the information associated with the second user in the second list 150, where the service provider identifier of the second user may be associated with that second user's telephone number and may serve as a second user identifier for the enrolled second user. Additionally, the enrollment subsystem 120 may store, in the second list 150, at least a portion of the second enrollment information obtained from the second user, e.g., the service identifier and the preferred geographic area that are associated with this second user.

FIG. 2 is a simplified block diagram of the registration and enrollment processing according to at least one embodiment.

For example, the processing 200 depicted in FIG. 2 may be performed by the enrollment subsystem 120 and the validation subsystem 126.

At operation 202, the enrollment subsystem 120 receives an enrollment request.

At operation 204, the enrollment subsystem 120 can check whether the enrollment request is for the enrollment of the first user or the second user.

If the enrollment request is for the enrollment of the first user, the processing 200 proceeds to operation 206. If the enrollment request is for the enrollment of the second user, the processing 200 proceeds to operation 207.

At operation 206, the enrollment subsystem 120 may receive first enrollment information that is the enrollment information with regard to the first user.

At operation 208, the validation subsystem 126 may validate the first enrollment information, e.g., validate the first user.

At operation 210, upon receiving a result of a successful validation of the first enrollment information of the first user from the validation subsystem 126, the enrollment subsystem 120 may enroll, e.g., register, the first user with the aggregation subsystem 102.

At operation 212, the enrollment subsystem 120 may store information of the first user in the first list 130 of the first storage subsystem 117.

If, at operation 204, it is determined that the enrollment request is for the enrollment of the second user, the processing 200 proceeds to operation 207.

At operation 207, the enrollment subsystem 120 may receive second enrollment information that is the enrollment information with regard to the second user.

At operation 222, the validation subsystem 126 may validate the second enrollment information, e.g., validate the second user.

At operation 224, upon receiving a result of a successful validation of the second enrollment information of the second user from the validation subsystem 126, the enrollment subsystem 120 may enroll, e.g., register, the second user with the aggregation subsystem 102.

At operation 226, the enrollment subsystem 120 may store information of the second user in the second list 150 of the first storage subsystem 117.

With reference again to FIG. 1A, when the first user desires the service, the aggregation subsystem 102 may match the first user with one or more second users among the second plurality of users.

In certain implementations, the first user may invoke, by a user input through the first user device interface 122, a service application associated with the aggregation subsystem 102. For example, the first user device interface 122 may display certain fields and/or prompts for the first user to enter information associated with the service that the first user desires to be performed. For example, the service application displayed on the first user device interface 122 may request the first user to enter user information such as, for example, user's e-mail, user identifier, and/or service identifier (e.g., for a desired service). The service application may then generate a service request message that includes user information.

In some embodiments, the aggregator processing subsystem 119 may include a matching subsystem 142. The matching subsystem 142 may receive the service request message from the first user device interface 122, e.g., via the service application. The service request message may include the first user identifier and the service identifier. The matching subsystem 142 can query a global positioning system (GPS) of the first user device 110 and may obtain a location of the first user device 110, e.g., positional coordinates that are sensed by the GPS of the first user device 110. However, this is not intended to be limiting. For example, the first user may provide a geographic location, e.g., a zip code, of a location at which the service is to be performed.

In some embodiments, the matching subsystem 142 may access the first storage subsystem 117. For example, the matching subsystem 142 may access the first list 130 to match the first user identifier with a first plurality of user identifiers of the first plurality of users that are enrolled with the aggregation subsystem 102 and whose user identifiers are stored in the first list 130. If the match is found, the first user requesting a service is a registered user. The registered user (or user device of the registered user) can be authenticated.

The matching subsystem 142 may also access the second list 150. For example, the matching subsystem 142 can search the second list 150 to identify one or more of the second plurality of users that match the service identifier provided by the first user requesting the service. The matching subsystem 142 may also identify those second users whose preferred geographic service area include the location of the first user device 110 as provided by the GPS of the first user device 110 or indicated by the first user. However, this is not intended to be limiting. For example, the matching subsystem 142 may use a GPS subsystem 143 to detect a number of the second plurality of user devices 116 located in a predetermined radius, e.g., 60 mile radius, of the location of the first user device 110 whose first user requested the service. Then, the matching subsystem 142 may access the second list 150 to perform the matching for the service requested by the first user, e.g., by checking the service identifiers of the detected second user devices located in the predetermined radius of the location of the first user device 110.

Upon identifying one or more second users as described above, the matching subsystem 142 may provide the information about the identified second user or users to the first user device interface 122. For example, the matching subsystem 142 may provide a signal to the first user device interface 122 to display the information about the identified second user or users and also display a prompt, e.g., a confirmation box, which is visually associated with each of the second users and requests a confirmation from the first user for the acceptance of the service from a particular second user. For example, the first user can operate a mouse to click on the confirmation box for acceptance of a particular second user. The click on the confirmation box can be detected by the touch pad of the first user device interface 122 that can send a specific electrical signal to the matching subsystem 142, informing the matching subsystem 142 about a selection, by the first user, of a particular second user.

Next, the matching subsystem 142 can contact the second user device 114 of the selected second user and provide, to the second user device 114 of the selected second user, the information about the service and the first user who requested the service. The matching subsystem 142 can also contact the first user device 110 of the first user requesting the service. The matching subsystem 142 can provide, to the first user device 110 of the first user requesting the service, the information about the service fee. If the first user is not a registered user, the matching subsystem 142 may request the first user to provide the payment credential as a guarantee for the payment for the service.

In some embodiments, the first storage subsystem 117 may include a service database 144. The service database 144 may include a service fee schedule associated with each service identifier. The service fee schedule may be in any form, e.g., a fixed fee schedule per requested service, per hour fee schedule, etc. In some implementations, a service fee can vary based on a condition, such as for example, predicted demand for requested service during certain time period, location of the service, details of the service, etc.

In an example, the service database 144 may store service data related to the requested service, e.g., the user identifier of the first user, the user identifier of the second user, the determined service amount for the requested service, the service identifier, the date of the service, location of the service, etc. The service amount is a total amount and includes a service fee amount for the service itself that is charged by the aggregation subsystem 102 on behalf of the second user and a surcharge amount, e.g., a fee charged by the aggregation subsystem 102 on its own behalf.

After the second user provides the service to the first user, the first user can invoke the payment application associated with the aggregation subsystem 102 to facilitate payment for the service. The payment application may be displayed on the first user device interface 122 and may show an amount due for the service rendered, e.g., the service amount. The service amount may be obtained from the service database 144. In embodiments, the payment application may have an additional field where the first user may optionally enter an additional amount, e.g., a tip for the service.

However, the described above is not intended to be limiting. In some implementations, the aggregation subsystem 102 may send a remittance request message to the first user device 110. A "remittance request message" may be a message that requests the first user, e.g., a patron, to pay for the provided service. The remittance request message may also include interaction information, such as any information associated with a current service, such as the service amount, a service provider identifier, a service location, etc., as well as any other information. After the second user provides the service to the first user, the first user can utilize the remittance request message to pay for the service. For example, the first user can open the message notification that is related to the remittance request message and provided on the first user device interface 122. This action can invoke the payment application associated with the aggregation subsystem 102 to facilitate payment for the service, as described above.

In an example, the first user enters the additional amount. The payment application may generate a remittance message including the service amount for a service rendered by the second user and the additional amount. The remittance message may also include one or more of the first user identifier of the first user, the second user identifier of the second user, the date and/or time of the service, the service identifier, the service amount, the additional amount, and/or payment credentials of the first user and/or the second user. In some embodiments, additionally to the service amount and the additional amount (or as an alternative to the service amount and/or the additional amount), the remittance message may include the total amount. For example, the remittance message has specific data fields where the above-listed exemplary information items can be provided.

As described above, in some embodiments, the first user might not be registered with the aggregation subsystem 102. In such embodiments, the first user can enter their financial information, e.g., a payment credential, card number, account number, etc., in the payment application, e.g., to be included in one of the data fields in the remittance message.

The aggregation subsystem 102 may further include a checking subsystem 154. The checking subsystem 154 is configured to receive the remittance message. The checking subsystem 154 is further configured to determine whether the remittance message includes the additional amount, for example, by analyzing the data field of the remittance message that is prescribed to contain the additional amount. Additionally or alternatively, the remittance message includes the total amount, as described above. The checking subsystem 154 may retrieve the service amount from the service database 144 and compare the service amount to the total amount in the remittance message. The checking subsystem 154 may then determine that the remittance message includes the additional amount if the total amount in the remittance message is greater than the service amount.

Upon determining that the remittance message includes the additional amount, the checking subsystem 154 forwards the remittance message including the service amount and the additional amount to the bifurcation subsystem 104.

In some implementations, the bifurcation subsystem 104 may include a plug-in processor 156. The plug-in processor 156 is configured to receive the remittance message. The plug-in processor 156 is further configured to identify, in the remittance message, the data fields that are prescribed to contain the service amount and the additional amount. Upon identifying the data fields containing the service amount and the additional amount, the plug-in processor 156 separates the service amount from the additional amount. For example, the plug-in processor 156 can extract the service amount and the additional amount from their corresponding data fields and separately process the service amount and the additional amount in separate message packages, as described below. Alternatively, the plug-in processor 156 may retrieve the service amount from the service database 144 and compare the service amount to the total amount in the remittance message. The plug-in processor 156 may then determine the additional amount as the difference between the total amount and the service amount. In some embodiments, the plug-in processor 156 may be referred to as a plug-in computer.

For example, the plug-in processor 156 may assign a first interaction identifier to the service amount and a second interaction identifier to the additional amount. The first interaction identifier may include first interaction data including the first user identifier, the second user identifier, the service amount, and/or the date of the service. The second interaction identifier may include second interaction data including the first user identifier, the second user identifier, the additional amount, and/or the date of the service.

The plug-in processor 156 may generate a service remittance message including the service amount and the first interaction identifier. The plug-in processor 156 then can send the service remittance message containing the service amount and the first interaction identifier to the aggregator processing subsystem 119.

The plug-in processor 156 may also generate an additional amount remittance message including the additional amount and the second interaction identifier. The plug-in processor 156 can send the additional amount remittance message including the additional amount and the second interaction identifier to a service processing computer 162. Upon receiving the additional amount remittance message, the service processing computer 162 initiates an immediate transfer, in real time, of the additional amount, from the account credential of the first user that is maintained by the first issuer 128 to the account credential of the second user that is maintained by the second issuer 146. For example, the service processing computer 162 invokes an instant payment application to transfer the additional amount.

However, the described above is not intended to be limiting. In some implementations, the service processing computer 162 may be a part of the bifurcated processing system 100. For example, the service processing computer 162 may be incorporated into the bifurcation subsystem 104.

In certain implementations, the aggregator processing subsystem 119 may include an aggregator 160. The aggregator 160 is configured to receive, from the plug-in processor 156, the service remittance message including the service amount and the first interaction identifier. The aggregator 160 may store the service amount due to the second user and the first interaction identifier in an aggregated service amounts database 168. In embodiments, the aggregated service amounts database 168 stores aggregated service amounts due to the second plurality of users for the services provided to the first plurality of users over a predetermined period of time. For example, the service amounts may be grouped by a second user identifier of each of the second plurality of users. As such, a plurality of service amounts relating to a plurality of interactions for the second user identifiers of the second plurality of users are accumulated. On a periodic basis, e.g., weekly, bi-weekly, etc., the aggregation subsystem 102 may cooperate with a payment processing system 170 to make a payment to each of the second plurality of users who provided services to the first plurality of users during the predetermined period of time. The payment may consist of the aggregated service amounts with the exception of the surcharges that the aggregation subsystem 102 keeps for each provided service.

However, the described-above is not intended to be limiting. In some embodiments, upon receiving each of the service remittance messages with respect to each interaction, the aggregator 160 may calculate the service fee amount earned by the second plurality of users for providing the services to the first plurality of users. For example, the aggregator 160 may deduct the surcharge amount due to the aggregation subsystem 102, from each of the service amounts indicated in each of the service remittance messages. Then, the aggregator 160 may store the service fee amounts that are due to the second plurality of users for the services provided to the first plurality of users in the aggregated service amounts database 168. The service fee amounts are then paid out to corresponding second users on a periodic basis as described above.

Figure 3:
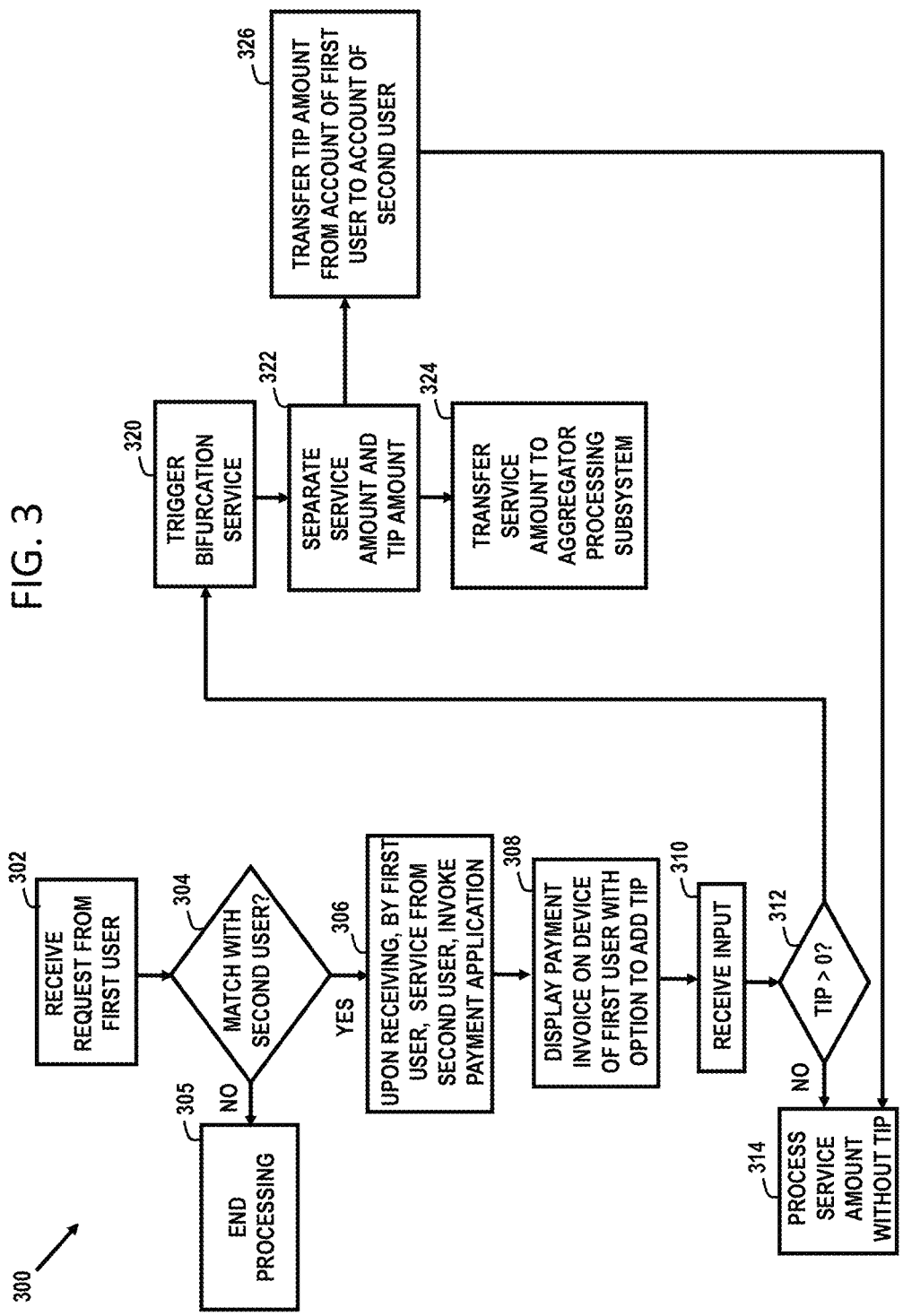
FIG. 3 is a simplified block diagram of a bifurcated processing according to at least one embodiment.

FIG. 3 is a simplified block diagram of a bifurcated processing according to at least one embodiment.

For example, the processing 300 depicted in FIG. 3 may be performed by at least the aggregator processing subsystem 119 and the bifurcation subsystem 104.

At operation 302, the aggregator processing subsystem 119 can receive a service request message initiated by the first user.

As described above, the first user may invoke, through the first user device interface 122, a service application associated with the aggregation subsystem 102. For example, the first user device interface 122 may display certain fields and/or prompts for the first user to enter information associated with the service that the first user desires to be performed. For example, the service application displayed on the first user device interface 122 may request the first user to enter user information such as, for example, user's e-mail, user identifier, and/or service identifier (e.g., for a desired service). The service application may then generate a service request message that includes user information.

At operation 304, the aggregator processing subsystem 119 can perform processing described above, to match the first user with one of the second plurality of users.

For example, the aggregator processing subsystem 119 may receive the service request message from the first user device interface 122, e.g., via the service application. The service request message may include the first user identifier and the service identifier. The aggregator processing subsystem 119 can query a GPS of the first user device 110 and may obtain a location of the first user device 110, e.g., positional coordinates that are sensed by the GPS of the first user device 110. However, the first user also may provide a geographic location, e.g., a zip code, of a location at which the service is to be performed.

For example, the aggregator processing subsystem 119 may access the first list 130 to match the first user identifier with a first plurality of user identifiers of the first plurality of users that are enrolled with the aggregation subsystem 102 and whose user identifiers are stored in the first list 130. If the match is found, the first user requesting a service is a registered user who may be authenticated.

The aggregator processing subsystem 119 may also access the second list 150. For example, the aggregator processing subsystem 119 can search the second list 150 to identify one or more of the second plurality of users that match the service identifier provided by the first user requesting the service. The aggregator processing subsystem 119 may also identify those second users whose preferred geographic service area include the location of the first user device 110 as provided by the GPS of the first user device 110 or indicated by the first user. However, this is not intended to be limiting. For example, the aggregator processing subsystem 119 may use a GPS subsystem 143 to detect a number of the second plurality of user devices 116 located in a predetermined radius, e.g., 60 mile radius, of the location of the first user device 110 whose first user requested the service. Then, the aggregator processing subsystem 119 may access the second list 150 to perform the authentication and matching for the service requested by the first user, e.g., by checking the service identifiers of the detected second user devices located in the predetermined radius of the location of the first user device 110.

Upon identifying one or more second users as described above, the aggregator processing subsystem 119 may provide the information about the identified second user or users to the first user device interface 122. For example, the aggregator processing subsystem 119 may provide a signal to the first user device interface 122 to display the information about the identified second user or users and also display a prompt, e.g., a confirmation box, which is visually associated with each of the second users and requests a confirmation from the first user for the acceptance of the service from a particular second user. For example, the first user can operate a mouse to click on the confirmation box for acceptance of a particular second user. The click on the confirmation box can be detected by the touch pad of the first user device interface 122 that can send a specific electrical signal to the aggregator processing subsystem 119, informing the aggregator processing subsystem 119 about a selection, by the first user, of a particular second user.

Then, the aggregator processing subsystem 119 can contact the second user device 114 of the selected second user and provide, to the second user device 114 of the selected second user, the information about the service and the first user who requested the service.

If, at operation 304, the first user is not matched with one of the second plurality of users, the processing 300 proceeds to operation 305. For example, the processing ends.

If, at operation 304, the first user is matched with one of the second plurality of users, the processing 300 proceeds to operation 306.

At operation 306, upon receiving, by the first user, the service from the second user, the first user device 110 of the first user may invoke the payment application associated with the aggregator processing subsystem 119, to facilitate payment for the service.

Alternatively, the aggregation subsystem 102 may send a remittance request message to the first user device 110. After the second user provides the service to the first user, the first user can utilize the remittance request message to pay for the service. For example, the first user can open the message notification that is related to the remittance request message and provided on the first user device interface 122. This action can invoke the payment application associated with the aggregation subsystem 102 to facilitate payment for the service, as described above.

At operation 308, the aggregator processing subsystem 119 can display a payment invoice on the first user device interface 122, e.g., in the payment application, and may show an amount due for the service rendered, e.g., the service amount.

In embodiments, the payment application may be displayed on the first user device interface 122 and may show an amount due for the service rendered, e.g., the service amount. The service amount is a total amount and includes a service fee amount for the service itself that is charged by the aggregation subsystem 102 on behalf of the second user and a surcharge amount, e.g., a fee charged by the aggregation subsystem 102 on its own behalf. In embodiments, the payment application may have an additional field where the first user may optionally enter an additional amount, e.g., a tip for the service. The payment application may generate the remittance message including the service amount for the service rendered by the second user to the first user and/or the additional amount.

The payment application may have a field where the unregistered first user can enter the payment credential. In this case, the payment application may generate the remittance message including the payment credential of the first user.

At operation 310, the aggregator processing subsystem 119 receives an input entered through the first user device interface 122 as reflected in the remittance message.

At operation 312, the aggregator processing subsystem 119 can determine whether the first user entered the additional amount into the payment application.

For example, the aggregator processing subsystem 119 determines whether the remittance message includes the additional amount, by analyzing the data field of the remittance message that is prescribed to contain the additional amount. Where the remittance message includes the total amount, the aggregator processing subsystem 119 may retrieve the service amount from the service database 144 and compare the service amount to the total amount in the remittance message. The aggregator processing subsystem 119 may then determine that the remittance message includes the additional amount if the total amount in the remittance message is greater than the service amount.

If, at operation 312, the aggregator processing subsystem 119 determines that the first user did not enter the additional amount into the payment application, the processing 300 proceeds to operation 314, to process the service amount without a tip. For example, the aggregator processing subsystem 119 may forward the remittance message that includes the service amount without a tip to the aggregator 160. The aggregator 160 may store the service amount due to the second user in the aggregated service amounts database 168 in association with the user identifier of the second user, to be processed on a periodic basis, as described above.

If, at operation 312, the aggregator processing subsystem 119 determines that the first user entered the additional amount into the payment application, the processing 300 proceeds to operation 320. For example, the aggregator processing subsystem 119 forwards the transaction request message including the service amount and the additional amount to the bifurcation subsystem 104.

At operation 320, a bifurcation service, e.g., the bifurcation subsystem 104, is triggered by receiving the transaction request message including the service amount and the additional amount.

At operation 322, the bifurcation subsystem 104 identifies, in the transaction request message, the service amount and the additional amount and separates the service amount from the additional amount.

In some implementations, the bifurcation subsystem 104 is configured to identify, in the remittance message, the data fields containing the service amount and the additional amount. Upon identifying the data fields containing the service amount and the additional amount, the bifurcation subsystem 104 separates the service amount from the additional amount. For example, the bifurcation subsystem 104 can extract the service amount and the additional amount from their corresponding data fields and separately process the service amount and the additional amount in separate message packages, as described below.

For example, the bifurcation subsystem 104 may assign a first interaction identifier to the service amount and a second interaction identifier to the additional amount.

At operation 324, the bifurcation subsystem 104 transfers the service amount to the aggregator processing subsystem 119.

For example, the bifurcation subsystem 104 may generate a service remittance message including the service amount and the first interaction identifier. The bifurcation subsystem 104 then can send the service remittance message containing the service amount and the first interaction identifier to the aggregator processing subsystem 119.

At operation 326, the bifurcation subsystem 104 facilitates a transfer of the additional amount from the account of the first user to the account of the second user.

For example, the bifurcation subsystem 104 may generate an additional amount remittance message including the additional amount and the second interaction identifier. The bifurcation subsystem 104 can send the additional amount remittance message including the additional amount and the second interaction identifier to a service processing computer 162. Upon receiving the additional amount remittance message, the service processing computer 162 initiates an immediate transfer, in real time, of the additional amount, from the account credential of the first user that is maintained by the first issuer 128 to the account credential of the second user that is maintained by the second issuer 146. For example, the service processing computer 162 invokes an instant payment application to transfer the additional amount.

Figure 4:
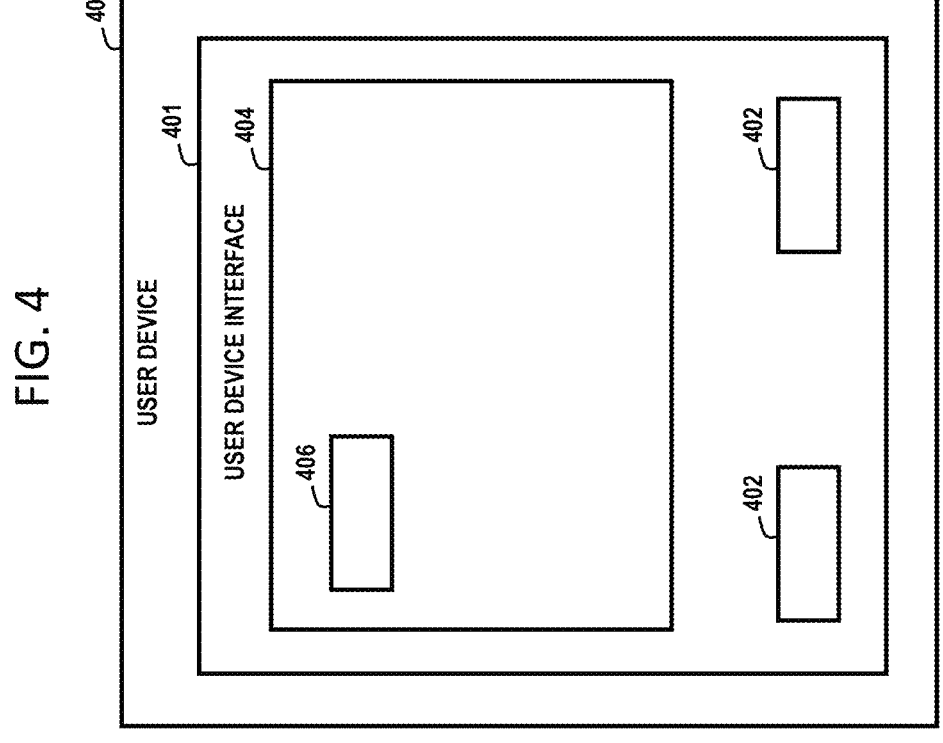
FIG. 4 shows a user interface according to at least one embodiment.

FIG. 4 shows a user device 400 according to at least one embodiment. The user device 400 may correspond to any one of the first plurality of user devices 112. The user device 400 may equally correspond to any one of the second plurality of user devices 116. For example, the user device 400 may be a mobile phone.

As shown in FIG. 4, the user device 400 includes a user device interface 401. The user device interface 401 may correspond to any one of the first user device interface 122 and the second user device interface 132.

The user device interface 401 may include one or more input devices 402 and an output device 404. The input devices 402 are shown as buttons. The output device 404 is shown as a screen.

While the user device interface 401 is shown with a particular configuration of the input devices 402 as buttons, it should be understood that the input devices 402 can take any suitable form, such as for example, a touch pad. For example, the output device 404 may be a touch screen including a display screen for providing a display output and a touch pad serving as the input devices 402.

FIG. 5 shows a block diagram of the user device 400 according to various embodiments.

The user device 400 may include a computer-readable medium 502, which can be in the form of (or may be included in) a memory element that stores data (e.g., resource provider applications) and can be in any suitable form (e.g., microSD chip, SIM card, or other type of memory element). The computer-readable medium 502 may include a transaction initiation module 502A, one or more applications 502B, and an operating system 502D for the user device 400. The transaction initiation module 502A may begin a transaction (e.g., an interaction) at the request of a user or an application.

The user device 400 may further include a storage element 502C storing user information, e.g., account information, payment credential, a token, etc. The storage element 502C may be a part of the computer-readable medium 502 or may be a secure memory element that is separate from the computer-readable medium 502, such that tokens or credentials can only be accessed or altered by certain elements of the user device 400 and/or outside devices.

In addition, the user device 400 may include device hardware 504 including a processor 506, a user interface 508, input elements 510, and output elements 512. The user interface 508 may correspond to the user device interface 401, the input elements 510 may correspond to the input devices 402, and the output elements 512 may correspond to the output device 404.

The device hardware 504 may further include a long range antenna 516 and a short range antenna 514 for communicating with a wireless network and/or other devices. For example, the long range antenna 516 and/or the short range antenna 514 may communicate with the bifurcated processing system 100.

All elements in the device hardware 504 are operatively coupled, enabling mutual communication and data transfer.

FIG. 6 shows a simplified block diagram of a method according to at least one embodiment. For example, the processing 600 depicted in FIG. 6 may be performed by the aggregation subsystem 102 and the bifurcation subsystem 104. The processing 600 depicted in FIG. 6 may be implemented in software (e.g., code, instructions, program) executed by one or more processing units (e.g., processors, cores) of the respective subsystems, using hardware, or combinations thereof. The software may be stored on a non-transitory storage medium (e.g., on a memory device). The method presented in FIG. 6 and described below is intended to be illustrative and non-limiting. Although FIG. 6 depicts the various processing operations occurring in a particular sequence or order, this is not intended to be limiting. In certain alternative embodiments, the processing 600 may be performed in some different order or some operations may be performed at least partially in parallel.

With continuing reference to FIG. 6, at operation 602, the aggregation subsystem 102 receives from the first user device 110 of a first user, a remittance message including at least a service amount for a service rendered by a second user to the first user.

At operation 604, the aggregation subsystem 102 identifies that the remittance message includes an additional amount that accompanies the service amount.

At operation 606, the aggregation subsystem 102, upon identifying that the remittance message includes the additional amount, forwards to the bifurcation subsystem 104, the remittance message including the service amount and the additional amount.

At operation 608, the bifurcation subsystem 104 identifies, in the remittance message, the service amount and the additional amount and separates the service amount from the additional amount.

At operation 610, the bifurcation subsystem 104 causes a transfer, in real time, of the additional amount from an account of the first user to an account of the second user. For example, the bifurcation subsystem 104 may assign a first interaction identifier to the service amount and a second interaction identifier to the additional amount, where the assigning the second interaction identifier to the additional amount causes a service processing computer 162, which is associated with the bifurcation subsystem 104, to transfer, in real time, the additional amount from an account of the first user to the account of the second user, where the account of the second user is associated with a second user device 114 of the second user. In some embodiments, the service processing computer 162 may invoke an instant payment application to transfer the additional amount. In certain implementations, the service processing computer 162 may be a part of the bifurcation subsystem 104.

For example, the second user device 114 includes a mobile phone and the account of the second user is linked to a telephone number of the mobile phone of the second user. Likewise, the first user device 110 includes a mobile phone and the account of the first user is linked to a telephone number of the mobile phone of the first user.

In some embodiments, the telephone number of the mobile phone of the second user may be registered with the aggregation subsystem 102 and the bifurcation subsystem 104. Likewise, the telephone number of the mobile phone of the first user may be registered with the aggregation subsystem 102 and/or the bifurcation subsystem 104 and stored as an identification information of the first user.

The bifurcation subsystem 104 may store the telephone number of the mobile phone of the second user in association with the account of the second user. The bifurcation subsystem 104 may store the telephone number of the mobile phone of the first user in association with the account of the first user.

At operation 612, the bifurcation subsystem 104 sends, to the aggregation subsystem 102, a service remittance message including the service amount and the first interaction identifier.

In some embodiments, upon receiving the service remittance message, the aggregation subsystem 102 stores the service amount in association with a user identifier of the second user, accumulates, over a predetermined period of time, one or more service amounts relating to one or more interactions for the user identifier of the second user, and enables a transfer of at least a portion of the one or more service amounts to the account of the second user after the predetermined period of time.

In certain implementations, the bifurcated processing system 100 performs processing including storing, by the aggregation subsystem 102 in a first storage subsystem 117, first identifiers, which respectively identify a first plurality of users, and second identifiers in association with service identifiers, the second identifiers respectively identifying a second plurality of users; receiving, by the aggregation subsystem 102 from the first user device 110, a service request message associated with one of the service identifiers; detecting, by the GPS subsystem 143, one or more user devices of the second plurality of user devices 116 within a radius of a location of the first user device 110; and selecting the second user device 114 from the one or more second user devices by matching the one of the service identifiers provided by the first user device 110 with a service identifier that is stored in the first storage subsystem 117 in association with the second identifier of the second user.

The disclosed techniques are for separating the tip (e.g., the additional amount) from the service amount (e.g., the amount owned for the performed service). Accordingly, the additional amount due to the worker is processed immediately. In comparison, in the related art systems and methods, the additional amount is processed together with the service amount. Because of the separating the additional amount from the service amount and processing the additional amount, e.g., paying out the additional amount to the worker immediately, the storage allocations can be reduced (e.g., managed more efficiently) which leads to the improved efficiency in the functioning of computer and computer networks.

Figure 7:
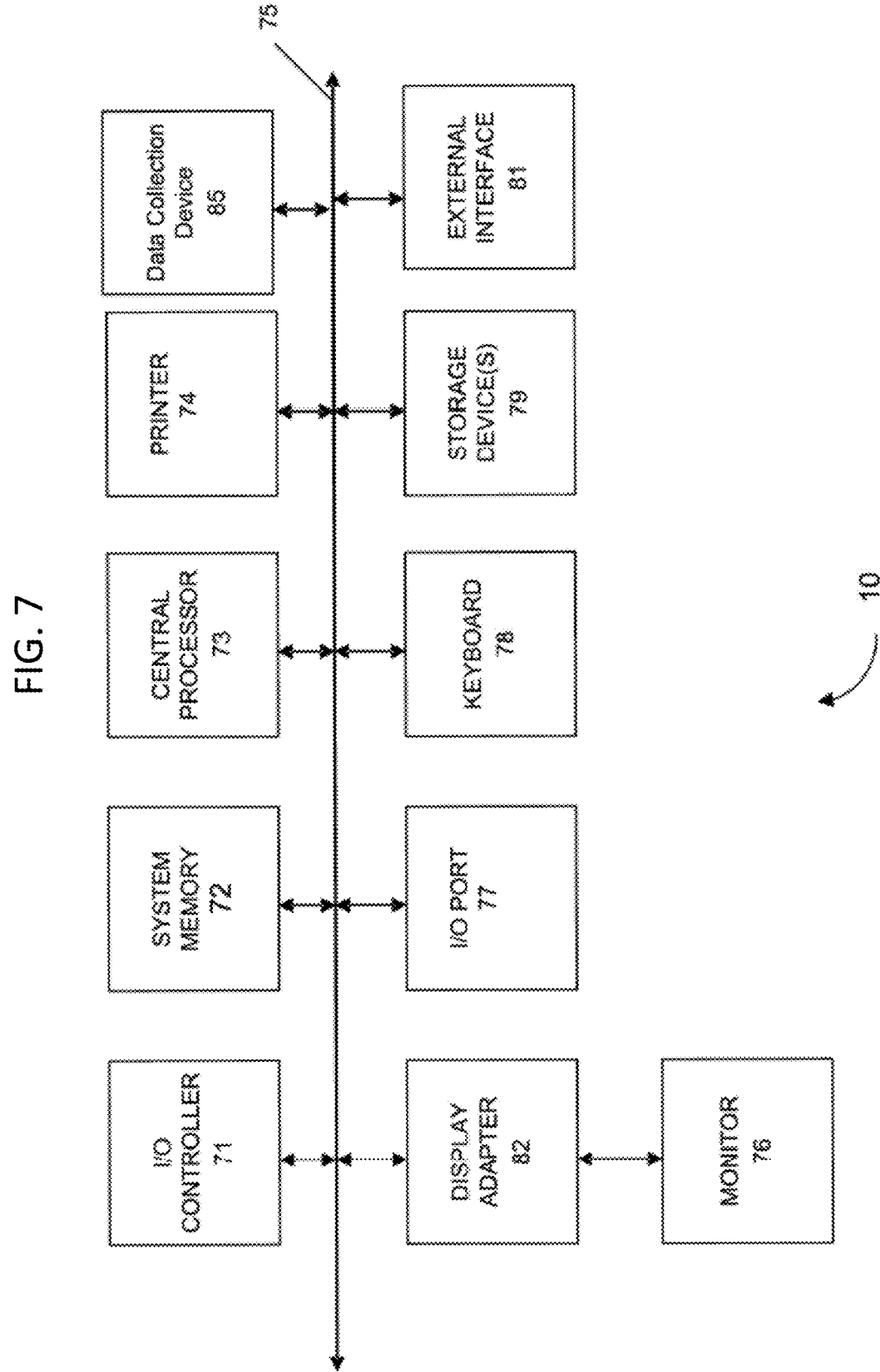
FIG. 7 shows a simplified block diagram of a computer system according to at least one embodiment.

As mentioned above, the bifurcated processing system 100 and/or each of the subsystems shown in FIG. 1A may be implemented using one or more computer systems, such as the computer system 10 shown in FIG. 7.

In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 7 are interconnected via a system bus 75. Additional subsystems such as a printer 74, keyboard 78, storage device(s) 79, monitor 76 (e.g., a display screen, such as an LED), which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of a plurality of instructions from system memory 72 or the storage device(s) 79 (e.g., a fixed disk, such as a hard drive, or optical disk), as well as the exchange of information between subsystems. The system memory 72 and/or the storage device(s) 79 may embody a computer-readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g. an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, any related art or object-oriented techniques. The software code may be stored as a series of instructions or commands on a computer-readable medium for storage and/or transmission. A suitable non-transitory computer-readable medium can include random access memory (RAM), a read only memory (ROM), a magnetic medium such as a hard-drive or a floppy disk, or an optical medium such as a compact disk (CD) or DVD (digital versatile disk) or Blu-ray disk, flash memory, and the like. The computer-readable medium may be any combination of such storage or transmission devices.

Such programs may also be encoded and transmitted using carrier signals adapted for transmission via wired, optical, and/or wireless networks conforming to a variety of protocols, including the Internet. As such, a computer-readable medium may be created using a data signal encoded with such programs. Computer-readable media encoded with the program code may be packaged with a compatible device or provided separately from other devices (e.g., via Internet download). Any such computer-readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the present disclosure has been presented for the purposes of illustration and description. It is not intended to be exhaustive or to limit the disclosure to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

All patents, patent applications, publications, and descriptions mentioned herein are incorporated by reference in their entirety for all purposes. None is admitted to be prior art.

What is claimed is:

1. A method comprising:

storing, by an aggregator platform computer in a storage device, first identifiers, which respectively identify a first plurality of users, and second identifiers in association with service identifiers, the second identifiers respectively identifying a second plurality of users;

receiving, by the aggregator platform computer from a user device of a first user among the first plurality of users, a service request message associated with one of the service identifiers;

detecting, by a GPS of the aggregator platform computer, one or more user devices of the second plurality of users that are located in a radius of a location of the user device of the first user;

selecting, by the aggregator platform computer, the user device of a second user from the one or more user devices by matching the one of the service identifiers provided by the user device of the first user with a service identifier that is stored in the storage device in association with the second identifier of the second user;

receiving, by the aggregator platform computer from the user device of the first user, a remittance message comprising at least a service amount for a service rendered by the second user to the first user;

identifying, by the aggregator platform computer, that the remittance message comprises an additional amount that accompanies the service amount;

upon identifying that the remittance message comprises the additional amount, forwarding, by the aggregator platform computer to a plug-in computer, the remittance message comprising the service amount and the additional amount;

identifying, by the plug-in computer in the remittance message, the service amount and the additional amount;

separating, by the plug-in computer, the service amount from the additional amount;

assigning, by the plug-in computer, a first interaction identifier to the service amount and a second interaction identifier to the additional amount, wherein the assigning the second interaction identifier to the additional amount causes a service processing computer associated with the plug-in computer to transfer, in real time, the additional amount from an account of the first user to an account of the second user, the account of the second user being associated with a user device of the second user;

sending, by the plug-in computer to the aggregator platform computer, a service remittance message comprising the service amount and the first interaction identifier;

storing, by the aggregator platform computer in an aggregated service amounts database, the service amount received in the service remittance message in association with a user identifier of the second user;

accumulating, by the aggregator platform computer in the aggregated service amounts database over a predetermined period of time, one or more service amounts relating to one or more services associated with the user identifier of the second user, the one or more service amounts comprising the service amount, wherein the service rendered by the second user to the first user is one of the one or more services; and enabling, by the aggregator platform computer, a transfer of at least a portion of the one or more service amounts to the account of the second user after the predetermined period of time.

2. The method of claim 1, wherein the user device of the second user comprises a mobile phone, and wherein the account of the second user is linked to a telephone number of the mobile phone.

3. The method of claim 2, further comprising:

prior to the receiving, by the aggregator platform computer, the remittance message, registering the telephone number of the mobile phone of the second user with the aggregator platform computer.

4. The method of claim 2, further comprising:

prior to the receiving by the aggregator platform computer the remittance message, storing, by the plug-in computer, an account number of the account of the second user in association with the telephone number of the mobile phone of the second user.

5. The method of claim 1, wherein the service processing computer invokes an instant payment application to transfer the additional amount.

6. The method of claim 1, wherein the service processing computer is a part of the plug-in computer.

7. The method of claim 1, wherein the user device of the first user comprises a mobile phone, wherein the account of the first user is linked to a telephone number of the mobile phone.

8. The method of claim 7, further comprising:

prior to the receiving by the aggregator platform computer the remittance message, storing, by the plug-in computer, an account number of the account of the first user in association with the telephone number of the mobile phone of the first user.

9. A computer system comprising:

a plug-in computer; and an aggregator platform computer comprising a first processor and a first non-transitory computer-readable medium comprising a first set of code that, when executed by the first processor, causes the first processor to:

store, in a storage device, first identifiers, which respectively identify a first plurality of users, and second identifiers in association with service identifiers, the second identifiers respectively identifying a second plurality of users, receive, from a user device of a first user among the first plurality of users, a service request message associated with one of the service identifiers, detect, by a GPS of the aggregator platform computer, one or more user devices of the second plurality of users that are located in a radius of a location of the user device of the first user, select the user device of a second user from the one or more user devices by matching the one of the service identifiers provided by the user device of the first user with a service identifier that is stored in the storage device in association with the second identifier of the second user, receive, from the user device of the first user, a remittance message comprising at least a service amount for a service rendered by the second user to the first user, identify that the remittance message comprises an additional amount that accompanies the service amount, upon identifying that the remittance message comprises the additional amount, forward, to the plug-in computer, the remittance message comprising the service amount and the additional amount, wherein the plug-in computer comprises a second processor and a second non-transitory computer-readable medium comprising a second set of code that, when executed by the second processor, causes the second processor to:

identify, in the remittance message, the service amount and the additional amount, separate the service amount from the additional amount, assign a first interaction identifier to the service amount and a second interaction identifier to the additional amount, wherein the assigning the second interaction identifier to the additional amount causes a service processing computer associated with the plug-in computer to transfer, in real time, the additional amount from an account of the first user to an account of the second user, the account of the second user being associated with a user device of the second user, and send, to the aggregator platform computer, a service remittance message comprising the service amount and the first interaction identifier, wherein the first processor is further configured to:

store, in an aggregated service amounts database, the service amount received in the service remittance message in association with a user identifier of the second user, accumulate, in the aggregated service amounts database over a predetermined period of time, one or more service amounts relating to one or more services associated with the user identifier of the second user, the one or more service amounts comprising the service amount, wherein the service rendered by the second user to the first user is one of the one or more services, and enable a transfer of at least a portion of the one or more service amounts to the account of the second user after the predetermined period of time.

10. The computer system of claim 9, wherein the user device of the second user comprises a mobile phone, and wherein the account of the second user is linked to a telephone number of the mobile phone.

11. The computer system of claim 10, wherein the aggregator platform computer is configured to:

register the telephone number of the mobile phone of the second user with the aggregator platform computer prior to the receiving the remittance message.

12. The computer system of claim 10, wherein the plug-in computer is configured to store an account number of the account of the second user in association with the telephone number of the mobile phone of the second user, prior to the aggregator platform computer receiving the remittance message.

13. The computer system of claim 9, wherein the service processing computer invokes an instant payment application to transfer the additional amount.

14. The computer system of claim 9, wherein the service processing computer is a part of the plug-in computer.

15. The computer system of claim 9, wherein the user device of the first user comprises a mobile phone, and wherein the account of the first user is linked to a telephone number of the mobile phone.

16. The computer system of claim 15, wherein the plug-in computer is configured to store an account number of the account of the first user in association with the telephone number of the mobile phone of the first user, prior to the aggregator platform computer receiving the remittance message.

17. The method of claim 1, wherein the receiving the service request message further comprises:

receiving the service request message from a user interface of the user device of the first user, via a service application executing on the user device of the first user.

18. The method of claim 1, further comprising:

prior to the detecting, determining, by the aggregator processing computer, the location of the user device of the first user, by querying a GPS of the user device of the first user.

* * * * *